United States Patent [19]
Chatterjee et al.

[11] Patent Number: 5,543,269
[45] Date of Patent: Aug. 6, 1996

[54] IMAGE WRITING ON CERAMICS

[75] Inventors: Dilip K. Chatterjee; Syamal K. Ghosh, both of Rochester; Wayne K. Shaffer, Penfield; Alan P. Vankerkhove, Rochester, all of N.Y.

[73] Assignee: Eastman Kodak Company, Rochester, N.Y.

[21] Appl. No.: 417,318

[22] Filed: Apr. 4, 1995

[51] Int. Cl.$^6$ .................. G03C 5/00; G03C 5/16
[52] U.S. Cl. ............... 430/346; 430/945; 501/13
[58] Field of Search ................... 430/346, 945; 501/13

[56] References Cited

U.S. PATENT DOCUMENTS

| | | | |
|---|---|---|---|
| 4,703,024 | 10/1987 | Aronov | 501/103 |
| 4,769,310 | 9/1988 | Gugger et al. | 430/346 |
| 4,833,532 | 5/1989 | Abe | 358/80 |
| 5,272,120 | 12/1993 | Kosuda et al. | 501/105 |
| 5,290,332 | 3/1994 | Chatterjee et al. | 65/18.1 |
| 5,336,282 | 8/1994 | Ghosh et al. | 51/309 |
| 5,358,913 | 10/1994 | Chatterjee et al. | 501/103 |

OTHER PUBLICATIONS

Schneider, Jr, Samual etol(ed), *Engineered Materials Handbook; vol. 4; Ceramics and Glasses*, ASM International, 1991, pp. 775–786.

Morris, William, *American Heritage Dictionary*, 1982, p. 318.

*Primary Examiner*—Cynthia Hamilton
*Attorney, Agent, or Firm*—Arthur H. Rosenstein

[57] ABSTRACT

The present invention relates to writing and marking images on ceramic surfaces in a reversible fashion. The images are marked using a laser. The images are erased by heating the ceramic surfaces to a temperature of approximately 200° C. or using a $CO_2$ laser.

5 Claims, No Drawings

IMAGE WRITING ON CERAMICS

FIELD OF THE INVENTION

The present invention relates to writing, marking or decorating ceramic surfaces in a reversible fashion using lasers. These writings, markings, images and imprintings are due to the photo-assisted reduction of oxide ceramics and their erasure is due to thermal assisted reoxidation.

BACKGROUND OF THE INVENTION

Writing or decorating ceramic surfaces, particularly on zirconia ceramics or oxide ceramics is not easy due to complexities of thermal glazing processes. In such thermal glazing processes, finer details of an image are not normally reproduced on ceramic surfaces. Writing on glass can be accomplished through acid (hydrofluoric) etching. Ceramics are typically decorated through screen printing or hand painting of various features. China and coffee mugs are examples of these technologies. The features imprinted on these objects are then fired at high temperatures to make them permanent and this process is called enameling. There exists a need for reversibly transferring images onto ceramic surfaces.

The present invention is not only capable of finer writing or decorating on the surface of the ceramics, it is also compatible with digital transfer of electronically captured images. The digitally captured images can be imprinted on the ceramic surfaces through use of laser systems. The reversible nature of this image transfer process is one of the most important features of the invention. The erasure of the laser written images can be accomplished in a simple and cost effective manner.

The present invention is a method of imaging a ceramic surface. It includes providing a ceramic having a surface with a contrast, the ceramic consisting essentially of zirconium oxide and a dopant selected from the group of rare earth oxides such as cerium oxide and oxides of calcium, magnesium, yttrium and scandium wherein the ceramic has a molar ratio of dopant to zirconium oxide of from about 0.5:99.5 to about 25:75, depending on the dopant species. For yttria as the dopant, the preferred molar range of yttria to zirconia is from about 0.5:99.5 to about 5.0:95.0. The crystal structure of the zirconia doped ceramic is essentially tetragonal in nature. A laser beam is focused on the ceramic surface, the laser beam having a diameter of 5 µm or greater for a time sufficient to change the contrast of the surface and produce an image. The method of the present invention is reversible in that the image can subsequently be erased.

The present invention also includes an image element comprising a ceramic surface having a first contrast, the ceramic surface consisting essentially of zirconium oxide and a dopant selected from the group of rare earth oxides and oxides of calcium, magnesium, yttrium, scandium and cerium wherein the ceramic has a molar ratio of dopant to zirconium oxide of from about 0.5:99.5 to about 25:75, depending on the dopant species. For yttria as the dopant, the preferred molar range of yttria to zirconia is from about 0.5:99.5 to about 5.0:95.0. The crystal structure of the zirconia doped ceramic is essentially tetragonal in nature. The surface is imaged by focusing a laser beam having a diameter 5 µm or greater on the surface for a time sufficient to change the first contrast. The image on the surface can be erased either through thermal heating or through $CO_2$ laser assisted heating.

In the present invention, the image quality that can be produced on the ceramic surface is of a much finer quality because grain size of the writing media can be made very small. In addition, the images can be electronically captured and digitally transferred to the media through lasers and the spot size of the lasers can be varied using appropriate optics. Other important advantages of this invention include faster image transference, image erasure, elimination of pretreatments and posttreatments such as thermal treatments of the written surfaces, and no use of chemicals or corrosive acids.

DESCRIPTION OF THE PREFERRED EMBODIMENTS

The present invention is a method of imaging of a ceramic surface and the resulting imaged ceramic article. The present invention includes the following features: the process to transfer the image is fast; the resolution of the final image is high; the process is easy to perform; the process is applicable to images that are electronically captured and digitally stored; and finally, the process is reversible in that the images can be erased from the ceramic surfaces either by low temperature ($\approx 200°$ C.) thermal oxidation or by laser assisted thermal oxidation.

In the present invention the surface chosen for imaging is a zirconia doped ceramic. It is preferred that the zirconia is doped with a secondary oxide selected from the group of rare earth oxides and oxides of calcium, magnesium, yttrium, scandium and cerium wherein the ceramic has a molar ratio of dopant to zirconium oxide of from about 0.5:99.5 to about 25:75, depending on the dopant species. Most preferably, the secondary oxide is yttria. For yttria as the dopant, the preferred molar range of yttria to zirconia is from about 0.5:99.5 to about 5.0:95.0. The crystal structure of the zirconia doped ceramic is essentially tetragonal in nature. The zirconia surfaces used in the present invention were either thermally or mechanically polished, or used as sintered. It is believed that resolution of laser written images on zirconia surfaces depends not only on the size of the laser spot but on the density and grain size of the zirconia being used. In U.S. Pat. Nos. 5,290,332; 5,336,282 and 5,358,913 methods for manufacturing zirconia articles having very high densities (6.03 to 6.06 grams/cc) using very fine (0.1 to 0.6 µm grain size, average size being 0.3 µm) zirconia alloy powders are disclosed. These ceramics are ideal candidates for transferring images onto their polished or as sintered surfaces.

The laser used for transferring the image onto the zirconia surfaces was a Nd:YAG laser, Q-switched, optically pumped with a krypton arc lamp. The wavelength of such a laser is approximately $1.06 \times 10^{-6}$ meters or 1.06 µm. The spot size or beam diameter of such a laser is approximately 100 µm in $TEM_{oo}$ (low order mode). The spot size can be increased to 300 µm in MM (multimode) using a 163 mm focusing lens. The beam diameters of such lasers can be made as small as 5 µm by using appropriate lenses. However, it should be kept in mind that laser spot size is a function of the laser-material interaction. The laser spot size depends on the laser wavelength and the lens optics. Thus, the ultimate dot density is determined by the laser and ceramic.

The following parameters were used in the writing and image transfer of a laser onto a sintered ceramic surface of zirconia:

Laser Power: CW average - 2 to 40 watts Peak Power - 50 W to 5 kW (Q-switched)

Pulse Rate: Up to 50 kHz

Pulse Width: 100 to 150 ns

Scan Field: 114.3×114.3 mm

Scan Velocity: Up to 3 meters/second

Repeatability: ±25 μm

The laser photo marking procedure used in the present invention is described below:

The marking system accepts only vector coordinate instructions and these instructions are fed into the system in the form of a plot file. The plot files are loaded directly into the scanner driver electronics. The electronically stored photographic images are converted to a vector format using a number of commercially available software packages (e.g., Corel Draw, Envision-It by Envision Solutions Technology, CA). In the working example of this invention the images were captured electronically with a digital flat bed scanner or a Kodak photo CD. The captured images were converted to the appropriate dot density of approximately 600 dots/cm. These images were then reduced to two colors by dithering to half tones. A raster to vector conversion operation was then executed on the half toned images. The converted vector files in the form of plot files were saved and were laser scanned onto the ceramic surfaces.

The laser written images can easily be erased from the zirconia surfaces by either heating the surfaces in air to around 200° C. for about 10 minutes or by treating with a $CO_2$ laser operating with the following parameters:

Wave Length: 10.6 μm

Peak Power: 300 watts - operated at 20% duty cycle

Average Power: 70 watts

Beam Size: 500 μm and the beam width was pulse modulated

The yttria doped-zirconia ceramic surfaces used in the present invention are an off-white color. The laser writing reduces the ceramic oxide and changes the off-white surface to black. This change in contrast from black to white produces the image. It is believed that dot densities of 1250 dots/inch are possible with the present invention.

While there has been shown and described what are at present considered to be the preferred embodiments of the invention, it will be obvious to those skilled in the art that various changes and modifications can be made herein without departing from the scope of the invention as defined by the appended claims.

What is claimed is:

1. A method of imaging a ceramic surface comprising:

providing a ceramic having a surface, having an image due to a color difference, the ceramic consisting essentially of zirconia and a dopant selected from the group consisting of rare earth oxides and oxides of calcium, magnesium, yttrium and scandium wherein the ceramic has a molar ratio of dopant to zirconia of from about. 0.5:99.5 to about 25:75, the ceramic having an essentially tetragonal crystal grain; and focusing a laser beam having a diameter of 5 μm or greater on the surface for a time sufficient to change the color difference of the surface by reducing the doped zirconium oxide to produce an image.

2. The method according to claim 1 wherein the focusing of a laser beam is determined by a digitized image converted to a dot density.

3. The method according to claim 2 wherein the dot density of the digitized image is approximately 1250 dots/inch (500 dots/cm).

4. The method according to claim 3 wherein the dot density of the digitized image is approximately 600 dots/inch (240 dots/cm).

5. The method according to claim 1 wherein the ceramic consists essentially of zirconia and yttria wherein the molar ratio of yttria to zirconia is from about 0.5:99.5 to about 5.0:95.0.

* * * * *